United States Patent [19]

Gittleman et al.

[11] Patent Number: 4,568,952
[45] Date of Patent: Feb. 4, 1986

[54] OPTICAL RECORD BLANK AND INFORMATION RECORD

[75] Inventors: Jonathan I. Gittleman, Lawrenceville; Robert A. Bartolini, Robbinsville, both of N.J.

[73] Assignee: RCA Corporation, Princeton, N.J.

[21] Appl. No.: 679,864

[22] Filed: Dec. 10, 1984

[51] Int. Cl.⁴ .................... G01D 15/34; G11B 7/24
[52] U.S. Cl. .................... 346/135.1; 346/76 L; 430/346; 430/945
[58] Field of Search .................... 346/135.1, 76 L; 430/346, 945

[56] References Cited

U.S. PATENT DOCUMENTS

| | | | |
|---|---|---|---|
| 4,101,907 | 7/1978 | Bell et al. | 346/135 |
| 4,176,277 | 11/1979 | Bricot et al. | 250/316.1 |
| 4,216,501 | 8/1980 | Bell | 358/128.5 |
| 4,300,143 | 11/1981 | Bell et al. | 346/135.1 |
| 4,329,697 | 5/1982 | Bell | 346/135.1 |
| 4,383,311 | 5/1983 | Ettenberg | 369/275 |
| 4,425,570 | 1/1984 | Bell et al. | 346/135.1 |
| 4,460,636 | 7/1984 | Watanabe | 428/212 |

*Primary Examiner*—E. A. Goldberg
*Assistant Examiner*—Gerald E. Preston
*Attorney, Agent, or Firm*—Birgit E. Morris; William J. Burke; Harley R. Ball

[57] ABSTRACT

A multi-layer optical record blank and information record comprises a light-reflective layer, a light-transmissive layer, a light-absorptive layer, and a heat-sensitive information layer wherein the thicknesses of the layers are chosen to achieve a low-reflection condition. Information is recorded as variations of an optical property in the information layer indirectly heated by light absorbed in the absorptive layer.

21 Claims, 2 Drawing Figures

OPTICAL RECORD BLANK AND INFORMATION RECORD

The invention relates to a multi-layer record blank and information record for use in optically recording information by means of an indirectly heated information layer.

BACKGROUND OF THE INVENTION

Bell in U.S. Pat. No. 4,216,501 discloses an optical record blank comprising a light-reflective layer, a light-transmissive layer overlying the reflective layer and a light-absorptive layer overlying the transmissive layer. The thickness of the layers are chosen in relation to the layers' optical constants such that a low-reflection and preferably an anti-reflection condition occurs at the surface of the absorptive layer. A recording light beam incident on the trilayer structure causes an ablation or deformation of the absorptive layer resulting in a variation of reflectivity in the information record.

Some materials, such as selenium, have desirable properties as an absorptive layer to obtain a high recording sensitivity and a high signal-to-noise ratio for optimum playback performance. Previously, these materials have been unusable at longer recording wavelengths because they become non-absorbing at these wavelengths.

SUMMARY OF THE INVENTION

An optical record blank comprises a light-reflective layer, a light-transmissive layer overlying the reflective layer, a light-absorptive layer ovrlying the transmissive layer, and an information layer overlying the absorptive layer. The layers are adjusted in thickness to achieve a low-reflection and preferably an anti-reflection condition at either the surface of the information layer or the interface between the absorptive and the information layers. An information record comprises the record blank in which information has been recorded as a variation of at least one optical property of the information layer.

DETAILED DESCRIPTION OF PREFERRED EMBODIMENTS

Figure 1:
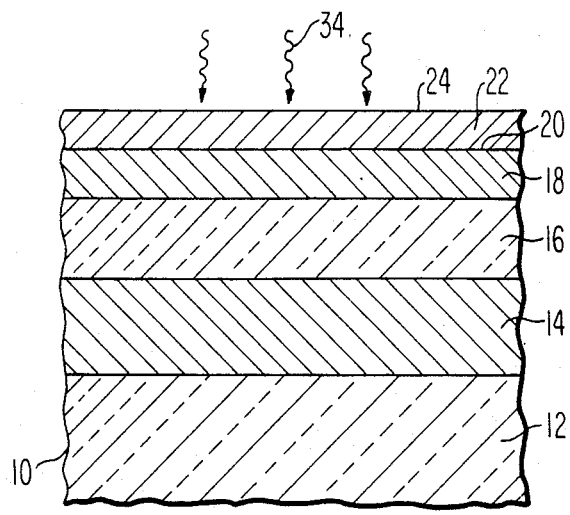
FIG. 1 is a schematic illustration of a cross-sectional view of a record blank of the invention.

In FIG. 1 a record blank 10 comprises a substrate 12, a light-reflective layer 14 overlying the substrate 12, a light-trnsmissive layer 16 overlying the reflective layer 14, a light-absorptive layer 18 having a connecting surface 20, overlying the transmissive layer 16, and an information layer 22 having an exposed surface 24, overlying the connecting surface 20.

Figure 2:
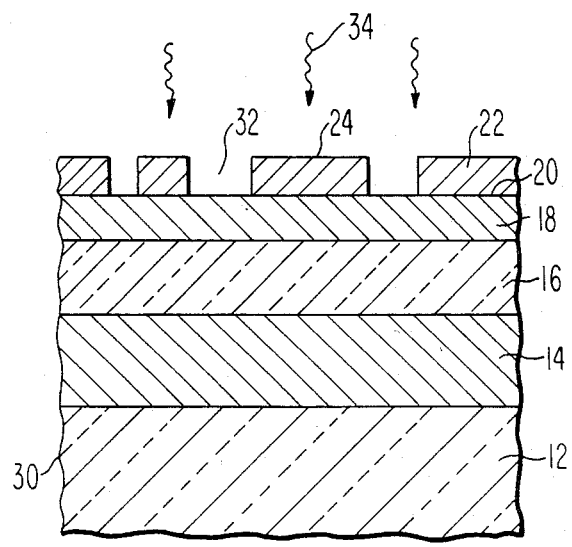
FIG. 2 is a schematic illustration of a cross-sectional view of an information record of the invention.

In FIG. 2 an information record 30 comprises the record blank 10 in which information has been stored by a series of variations 32 of at least one optical property of the information layer 22. The identification of the elements of the information record 30 otherwise corresponds to those of FIG. 1.

The substrate 12 may be formed of a glass or plastic material which provides support for the record blank 10. Alternatively, the substrate 12 may be formed of a light reflecting material, thus combining the functions of the substrate 12 and the reflective layer 14.

The reflective layer 14 reflects a substantial fraction, preferably at least 50 percent, of the incident recording light beam. Suitable materials which may be vacuum deposited on the substrate 12 include, but are not limited to, gold, silver, and aluminum.

The transmissive layer 16 comprises a material which is substantially transparent to light at the recording wavelength. Suitable materials which may be vacuum deposited on the reflective layer 14 include, but are not limited to, silicon dioxide and aluminum oxide.

The absorptive layer 18 comprises a material which absorbs light at the recording wavelength and which preferably has a melting temperature at least 200° C. greater than the temperature at which a change occurs in the optical properties of the information layer 22. Suitable materials which may be vacuum deposited on the transmissive layer 16 include, but are not limited to, germanium, aluminum and titanium.

The information layer 22 comprises a material in which at least one optical property changes when heated. Typical changes of optical properties such as reflectivity or transmissivity may be obtained through a change in the crystalline structure, a change in the magnetization, or an ablation or deformation of the material. The information layer 22 is less absorptive than the absorptive layer 18 and preferably is substantially transparent at the recording wavelength. The information layer 22 may be vacuum deposited on the absorptive layer 18 and may be formed, for example, of selenium or a selenium alloy which has a low melting temperature and is substantially transparent at the recording wavelength, typically greater than 700 nanometers (nm).

Information is recorded in the record blank 10 when recording light 34, incident on the exposed surface 24 and passing through the information layer 22, enters and is absorbed in the absorptive layer 18. The indirect heating of the information layer 22, from the absorptive layer 18, produces variations 32 in the optical properties of the information layer 22 in the information record 30. The length and separation of the variations 32 is representative of the recorded information. These variations are detected upon readout as local variations in the reflectivity of the information record.

In a preferred form, based on the optical properties of the materials, the thicknesses of the layers are chosen such that a difference in reflectivity exists between said connecting surface 20 and said exposed surface 24, with the less reflective surface exibiting a low-reflection condition. The low-reflection condition reflects less than 30 percent of the incident light, typically less than 10 percent and preferably exhibits an anti-reflection condition. It is to be understood that the reflectivity at the connecting surface 20 is determined in the absence of the information layer 22. Thus, the transmissive layer 16, the absorptive layer 18, and the information layer 22 may be chosen in thickness such that a low-reflection and preferably an anti-reflection condition exists at the exposed surface 24. Alternatively, the transmissive layer 16 and the absorptive layer 18 may be chosen in thickness such that a low-reflection and preferably an anti-reflection condition exists at the connecting surface 20 in the absence of the information layer 22. The information layer 22 is then chosen in thickness such that the heat generated in the absorptive layer 18 produces a sufficient change in the optical properties of the information layer 22 for information to be detected. For example, a record blank designed to operate at a wavelength of 820 nm includes an aluminum reflective substrate, a 313 nm thick silicon dioxide transmissive layer and a 15 nm thick amorphous germanium absorptive layer. These thicknesses and materials result in an anti-reflection condition at the surface of the germanium layer.

if selenium is used in the information layer 22, contrast ratios may be calculated for various thicknesses of undisturbed portions of the surface of the selenium layer and the low-reflection surface which is exposed by ablation or deformation of the selenium layer. The contrast ratio is determined from the formula $$C = \frac{R_1 - R_2}{R_1 + R_2}$$

where $R_1$ is the reflectivity of the more reflective surface and $R_2$ is the reflectivity at the low-reflection surface. Preferably, the contrast ratio would be at least about 6 percent which would result in the minimum thickness of selenium to be approximately 10 nm.

Additionally, the thickness of the information layer 22 should be less, and preferably four or more times less, than its thermal diffusion length such that the heat generated in the absorptive layer 18 will cause a detectable variation 32 in an optical property of the information layer 22. The thermal diffusion length is given by the formula $$l = \sqrt{KT}$$

where K is the thermal diffusivity of the material and T is the recording transient time as determined by the time a given area of the information record 30 is exposed to light of the recording wavelength. The selenium information layer has an approximate thermal diffusivity of $0.28 \times 10^{-2}$ cm$^2$/sec. and considering a transient time of 30 nanoseconds, the thermal diffusion length will be approximately 120 nm. To provide for an ablation or deformation of the selenium information layer, the maximum thickness should be less than 120 nm and preferably less than 30 nm. The thickness chosen for the selenium layer is thus a compromise between the minimum thickness required to obtain an adequate contrast ratio and the maximum usable thickness to obtain an ablation or deformation of the selenium layer.

An overcoat layer such as that described by Bell et al. in U.S. Pat. No. 4,101,907 may be placed over the information layer to protect the medium. The overcoat layer comprises a material having a thickness and elastic properties sufficient to allow the information layer 22 to substantially deform. Alternatively, the functions of a transparent substrate and the overcoat layer may be combined.

Well-known techniques for recording and readout of the optical multi-layer record blank and information record may be utilized such as those described by Bell et al. in U.S. Pat. No. 4,101,907.

We claim:

1. A record blank for use in optically recording information at a certain wavelength which comprises:
    a light-reflective layer;
    a light-transmissive layer overlying said reflective layer;
    a light-absorptive layer having a connecting surface and overlying said transmissive layer; and
    an information layer overlying said connecting surface, having an exposed surface and comprising a material in which at least one optical property changes when heated;
    said trnsmissive, absorptive, and information layers have thicknesses such that there is a difference in reflectivity between said connecting and exposed surfaces with the less reflective surface exibiting a low-reflection condition.

2. The record blank of claim 1 wherein the low-reflection condition exists at the connecting surface.

3. The record blank of claim 2 wherein an anti-reflection condition exists at the connecting surface.

4. The record blank of claim 1 wherein the low-reflection condition exists at the exposed surface.

5. The record blank of claim 4 wherein an anti-reflection condition exists at the exposed surface.

6. The record blank of claim 1 wherein the absorptive layer has a melting temperature at least 200° C. greater than the temperature at which a change occurs in an optical property of the information layer.

7. The record blank of claim 1 wherein the thickness of said information layer is between about 10 and 120 nanometers.

8. The record blank of claim 7 wherein the thickness of said information layer is between about 10 and 30 nanometers.

9. The record blank of claim 1 wherein said information layer is comprised of a material less absorptive at said wavelength than the absorptive layer.

10. The record blank of claim 9 wherein said information layer is comprised of a material substantially transparent at said wavelength.

11. The record blank of claim 1 wherein said information layer is comprised of a material selected from the group consisting of selenium and selenium alloys.

12. An information record for use in an optical storage and recording system utilizing light of a certain wavelength which comprises:
    a light-reflective layer;
    a light-transmissive layer overlying said reflective layer;
    a light-absorptive layer having a connecting surface and overlying said transmissive layer; and
    an information layer having an information track therein, said information layer overlying said connecting surface, having an exposed surface, comprising a material in which at least one optical property changes when heated;
    said information track comprising a succession of variations in the optical properties of the information layer with the length and the spacing between the variations being representative of the recorded information;
    said transmissive, absorptive, and information layers have thicknesses such that there is a difference in reflectivity between said connecting and exposed surfaces with the less reflective surface exibiting a low-reflection condition.

13. The information record of claim 12 wherein the low-reflection condition exists at the connecting surface.

14. The information record of claim 13 wherein an anti-reflection condition exists at the connecting surface.

15. The information record of claim 12 wherein the low-reflection condition exists at the exposed surface.

16. The information record of claim 15 wherein an anti-reflection condition exists at the exposed surface.

17. The information record of claim 12 wherein the absorptive layer has a melting temperature at least 200° C. greater than the temperature at which a change occurs in an optical property of the information layer.

18. The information record of claim 12 wherein the thickness of said information layer is between about 10 and 120 nanometers.

19. The information record of claim 18 wherein the thickness of said information layer is between about 10 and 30 nanometers.

20. The information record of claim 12 wherein said variations in the optical properties consist of an ablation or deformation of the information layer.

21. The information record of claim 12 wherein said information layer is comprised of a material selected from the group consisting of selenium and selenium alloys.

* * * * *